Sept. 13, 1955           M. D. WELSH          2,717,803
CANOPY ATTACHING MEANS FOR BABY STROLLER
Filed June 15, 1951                             2 Sheets-Sheet 1

INVENTOR
MATILDA D. WELSH
BY John H...
ATTORNEY

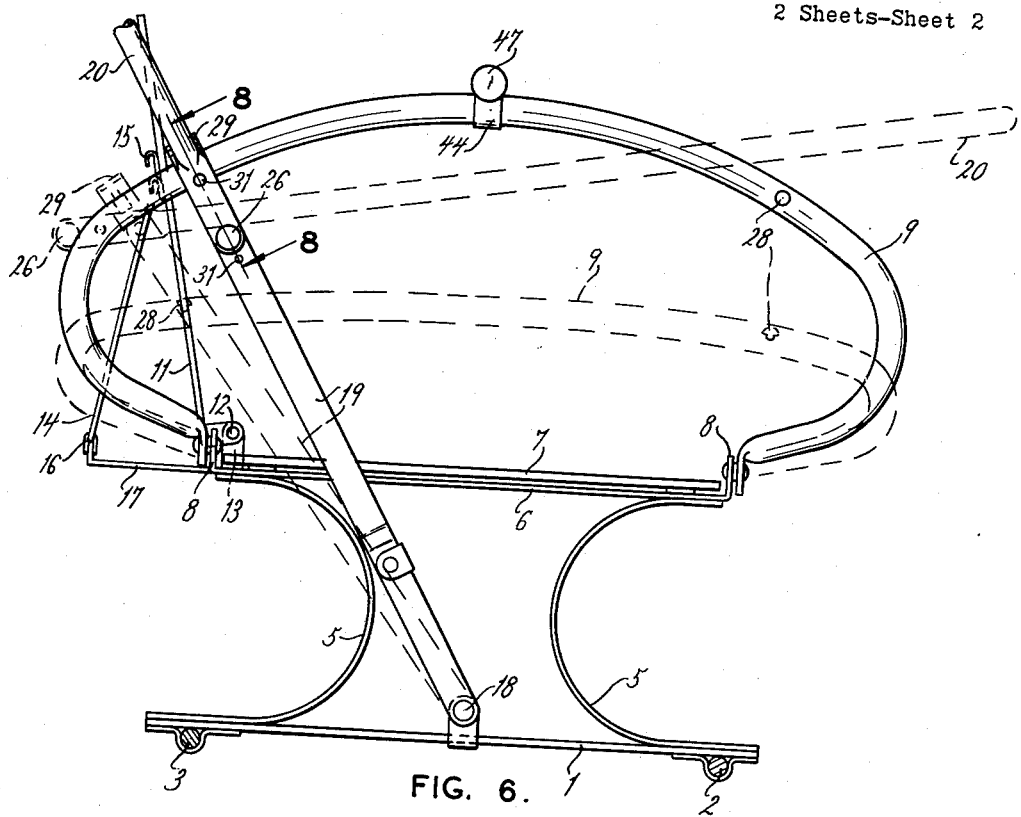
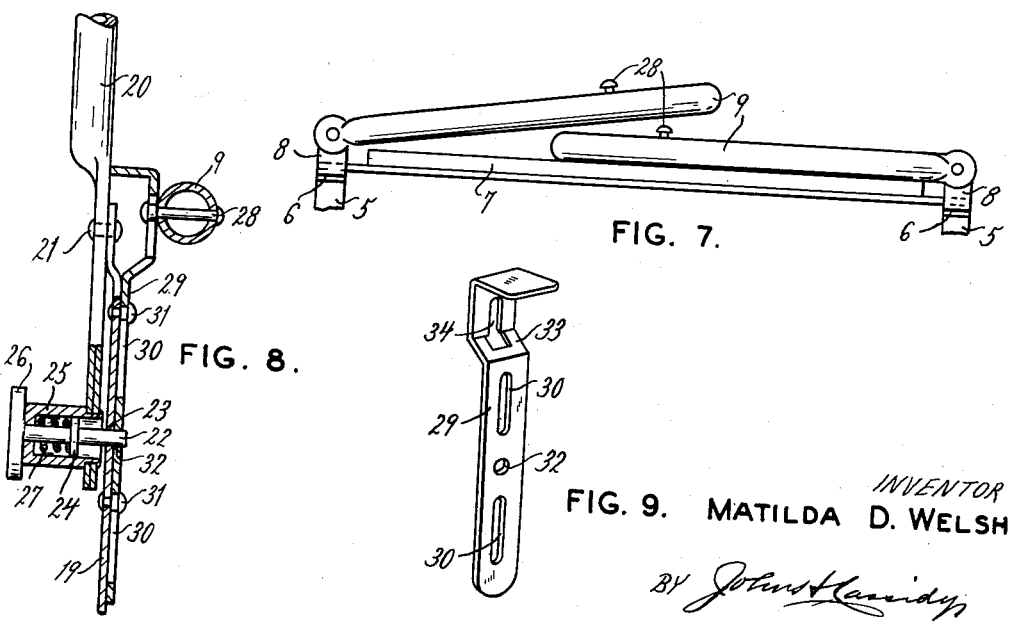
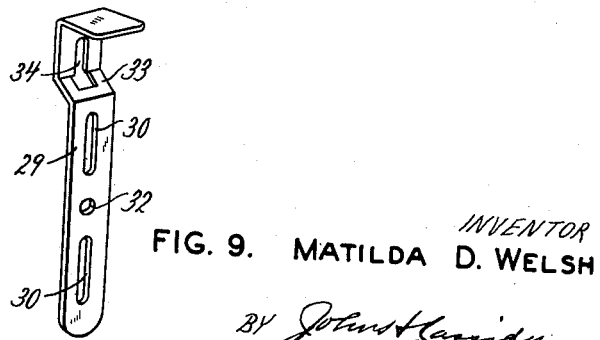

United States Patent Office 2,717,803
Patented Sept. 13, 1955

2,717,803

CANOPY ATTACHING MEANS FOR BABY STROLLER

Matilda D. Welsh, La Due, Mo.

Application June 15, 1951, Serial No. 231,693

4 Claims. (Cl. 296—110)

This invention pertains to baby strollers of the collapsible type. In general terms, the structure of this invention comprises a stroller body spring-supported on a chassis having road wheels. The body is formed with hinged back and sides which may be folded down upon the bottom thereof. A handle frame extends around the body and is pivoted on the chassis so as to swing fore and aft, and means are provided for locking it in operating position either in rear of, or in front of the body. A collapsible canopy top is arranged to be detachably hinged to the sides of the body with means whereby the detachable hinge connections may be secured against accidental dislodgement, and a link connection is arranged for detachable connection to one of the sides to hold the top in position.

A preferred embodiment of this invention is illustrated in the accompanying drawings, in which:

Fig. 6 is a partial side view, somewhat enlarged, of the body and its support on the chassis;

Fig. 7 is a detail front view of the same;

Fig. 8 is an enlarged section on line 8—8 of Fig. 6; and

Fig. 9 is a perspective detail of Fig. 8.

Figure 1:
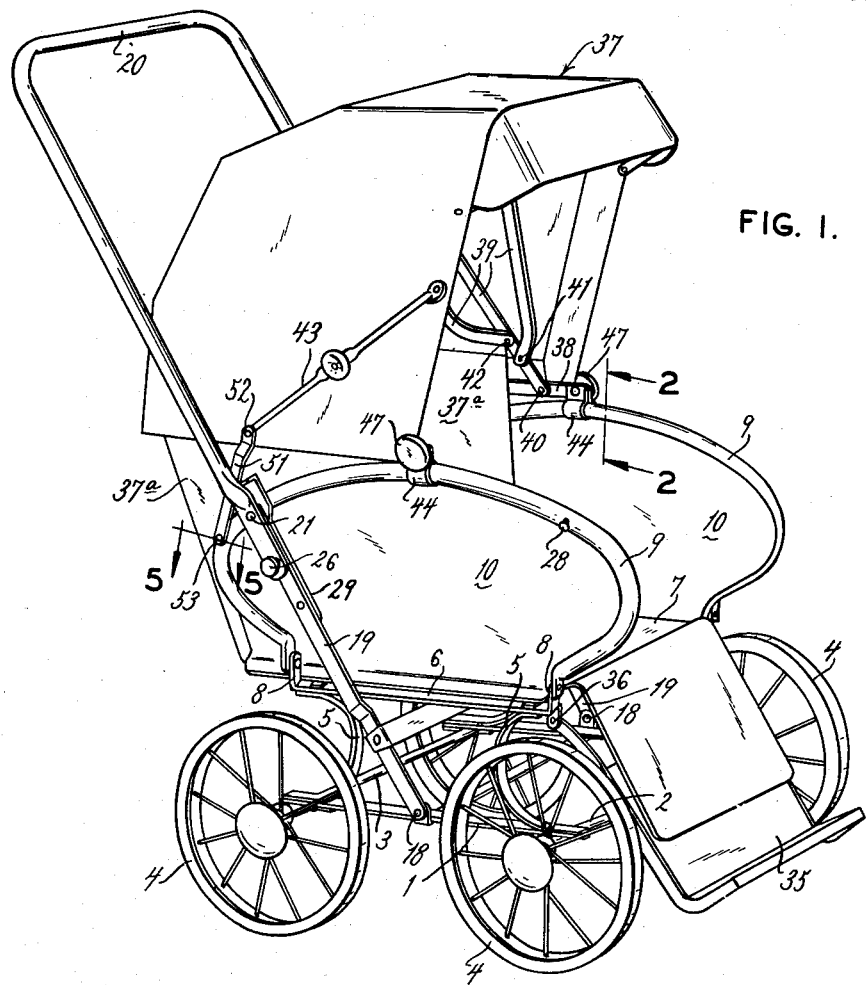
Fig. 1 is a perspective view of a stroller embodying this invention.
Figure 2:
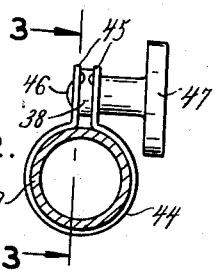
Fig. 2 is an enlarged section on line 2—2 of Fig. 1.

Referring to the drawings, 1 designates a chassis provided with axles 2 and 3 on which road wheels 4 are mounted in the usual manner. Springs 5, supported on the chassis, extend upward therefrom and in turn support side strips 6 on which the bottom or floor 7 of the body is supported. The strips 6 have their ends turned up at 8, to which ends curved side rails 9 are pivoted as shown in Fig. 6. Webs 10, of fabric or other suitable material are mounted in the side rails 9 as frames, to provide sides for the body. These sides are thus pivoted to fold inward upon the floor 7 as shown in Fig. 7. A back 11 is also mounted by pivots 12 to upright lugs 13 on the floor structure. Only one of these pivotal connections appears in the drawing, though there is one on each side of the body. The back 11 is thus foldable forward upon the floor structure before folding the side rails 9. When in upright position the back 11 may be supported by a brace 14 engageable with a catch 15 on said back and pivoted at 16 on a rearward extension 17 of the floor structure.

Pivoted at 18 on the chassis 1 is a pair of lower sections 19, only one of which appears in the drawing, of a handle frame, the tubular upper section of which extends upward over the body as shown in Fig. 1 and provides at 20 a handle bar for manipulating the stroller. This handle frame is sectionalized to permit folding it when the body is collapsed. Each lower section 19 is pivoted at 21 to the flattened terminal portion of the upper section forming the handle bar 20. The two sections are held rigid when in extended position by a latch pin 22 on the upper section engaging a complementary perforation 23 in the lower section 19. The latch pin 22 has an enlarged portion 24 guided for axial movement in a cylindrical cup 25 mounted at its open end in the end of the section 20 as shown in Fig. 8. The pin 22 passes through a perforation in the base of the cup and terminates in a head 26 for manipulation thereof. A spring 27 between the base of the cup and the enlarged portion 24 on the pin serves to bias the latter for entering the perforation 23. When these parts are in their extended positions as shown in Figs. 1, 6 and 8, the handle frame, including the sections 19 and 20, is rigid and may be rocked on its pivots 18. When the pins 22 (there being one on each side of the body) are withdrawn from the perforations 23, the handle frame may be folded over the collapsed body as indicated in dotted lines in Fig. 6.

The handle frame as a whole may also be secured in either of two operating positions, one at the rear of the body, as shown in Fig. 1, and the other in a symmetrical position at the front of the body. For this purpose the rails 9 are each provided with protruding headed pins 28 located in those positions. At each junction of the sections 19 and 20 a sliding latch member 29 is provided, engageable with the pins 28. The member 29 has a pair of guide slots 30 slidable on a pair of guide pins 31 fixed on the section 19 of the handle frame. Said member is also provided with a perforation 32 which, when said member is in latching position, registers with the perforation 23 so as to receive the pin 22 which then locks both members 19 and 29. The upper end of the member 29 is off-set as shown at 33 and is provided with a keyhole slot 34 adapted to slip over one of the pins 28 to latch the handle frame in either forward or after position. Thus, to change this frame from one of these positions to the other, the latch members 29 are released by pulling out the pins 22 just enough to disengage the perforations 32 and then sliding said members upward to disengage the pins 28 from the keyhole slots 34. The handle frame may then be moved to its other position and the slots 34 engaged with the pins 28 in that position. When the latch members 29 are pushed down, the pins 22 re-engage the perforations 32 and lock the whole structure.

A foot rest 35 may be provided, pivoted at 36 for folding adjustment in the usual manner.

A top for the stroller comprises a canopy 37, of fabric, leather, or other flexible material, mounted at its bottom on a U-shaped metallic strap, the legs of which provide supporting side bars 38, only one of which is visible in Fig. 1. Fan ribs 39 extend radially from points near the free ends of the bars 38, one of them being pivoted at 40 to the bar 38 and the others being pivoted at 41 and 42 respectively to the first. Each of these ribs is U-shaped, extending up to the top of the canopy 37 and thereacross to the opposite side, being secured thereto at appropriate points, and down to a similar pivotal mounting at the other supporting bar 38. This is a well-known construction and needs no further description. It renders the canopy collapsible by folding said fan ribs together on their pivots. A toggle brace 43 maintains the canopy in extended position in a well known manner. A flexible apron 37a is also secured to the support 38, depending therefrom and extending around the rear of the inside of the body.

Figure 4:
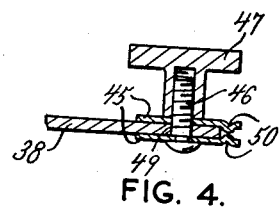
Fig. 4 is a section on line 4—4 of Fig. 3.
Figure 5:
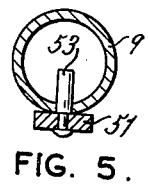
Fig. 5 is an enlarged section on line 5—5 of Fig. 1.
Figure 3:
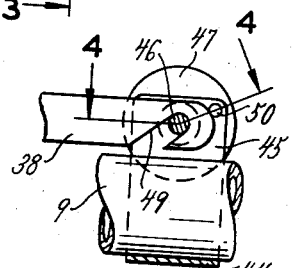
Fig. 3 is a section on line 3—3 of Fig. 2.

In order to mount the top on the body a releasable pivotal connection is provided on the top portion of each side rail 9 near the middle of the body. Such connection may comprise a strap 44 encircling the rail 9 and provided with perforated upstanding wings 45. A threaded clamping stud 46 is secured to one of the wings 45 and passes through the perforation of the other as shown in Fig. 4. A thumb nut 47, threaded on the stud 46, serves, when screwed up, to clamp the wings 45 together. Each of the bars 38 has an oblique slot 49 providing a hook connection engageable with the stud 46 (see Fig. 3) to provide a releasable connection for mounting the canopy on the body. The wings 45 may be provided with small lugs or pimples 50 struck inward therefrom and so located with respect to the stud 46 as to prevent accidental disengagement of the slot 49 therefrom, as shown in Fig. 3. When the thumb nut 47 is tightened up, this connection becomes secure and rigid. In order to locate the top in its proper position, a link 51 is pivoted at 52 to one of the bars 38 and carries at its other end a pin 53 engageable in a perforation properly located in the adjacent side rail 9 of the body as shown in Figs. 1 and 5. Thus, when the top is to be removed, the thumb nuts 47 are loosened until the lugs 50 may separate sufficiently to permit disengagement of the slots 49 from the studs 46, the pin 53 is slipped out of the hole in the rail 9, and then the slots 49 are unhooked to free the top. While only one link 51 is shown, a duplicate thereof may be provided on the other side of the top.

I claim:

1. In a baby stroller having a body provided with side rails, a top including a canopy provided with supporting base bars one of which is formed with a pivot slot, releasable pivotal connections between said rails and said base bars, one of said connectors including a pivot stud engageable in said pivot slot and a stop adjacent said stud positioned to prevent disengagement of said slot from said stud, a link pivotally connected to said top on one of said bars, and a releasable connection between said link and one of said rails adapted to position said link to retain said top in operating position.

2. A baby stroller having a body provided with side rails, a top including a canopy provided with supporting base bars and fan ribs pivoted thereto in diverging relation to support said canopy, one of said side bars having a pivot slot formed in angular position therein, releasable pivotal connections between said base bars and said rails, one of said connections including a pair of ears on one of said rails, a pivot stud extending between said ears and engageable in said pivot slot, and a stop on one of said ears positioned to prevent disengagement of said base bar from said stud, clamping means adjustable to retain said connections against release while permitting pivotal movement thereof, a link pivotally connected to said top, and a releasable connection between said link and one of said rails.

3. A baby stroller having a body provided with side rails, a top including a canopy provided with supporting side bars, pivot supports on said rails, hook connections formed on said side bars engageable with the pivots on said supports for pivotally mounting said top on said body, and stop means on said pivot supports adjustable out of and into the path of disengagement of said side bars from said pivots to retain said hook connections while permitting pivoted movement thereof.

4. A baby stroller having a body provided with side rails, a top including a canopy provided with supporting side bars, and releasable pivotal connections between said side bars and said rails; one of said connections including side bars and said rails; one of said connections including a pair of ears on the rail, a pivot stud extending between said ears, one of said side bars being formed with a diagonal slot engageable with said stud as a pivot, a stop lug on one of said ears positioned in line with said slot when the side bar is in normal position, and clamping means on said stud operating on the ear to move said lug into and out of position to prevent disengagement of the slot from the stud.

References Cited in the file of this patent

UNITED STATES PATENTS

| 1,037,173 | Collier | Aug. 27, 1912 |
| 1,225,038 | Kiser | May 8, 1917 |
| 1,652,190 | Wills | Dec. 13, 1927 |
| 1,779,742 | Lines | Oct. 28, 1930 |
| 2,107,940 | Hedstrom, Jr. | Feb. 8, 1938 |
| 2,134,855 | Bucher | Nov. 1, 1938 |

FOREIGN PATENTS

| 70,897 | Austria | Jan. 10, 1916 |